H. E. REX.
EGG HANDLING DEVICE.
APPLICATION FILED AUG. 25, 1913.
1,106,059.
Patented Aug. 4, 1914.
2 SHEETS—SHEET 2.
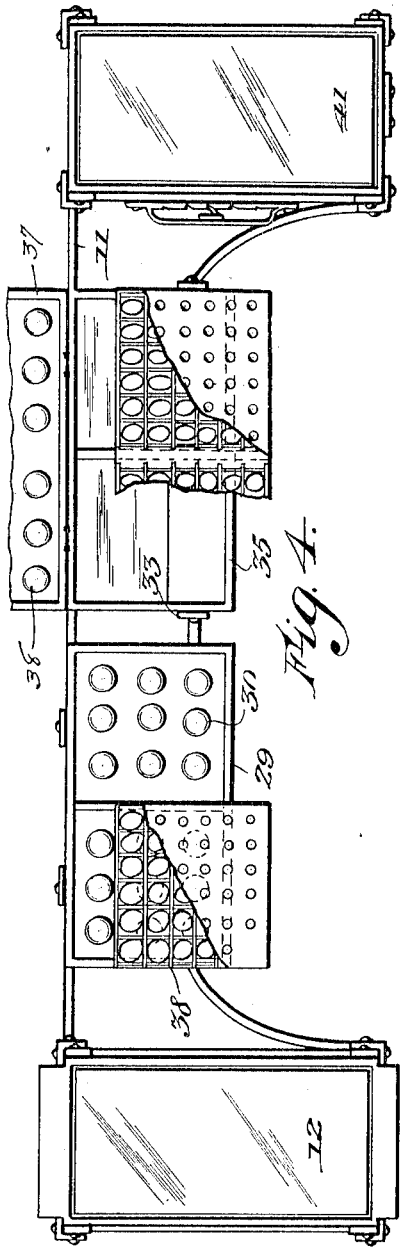
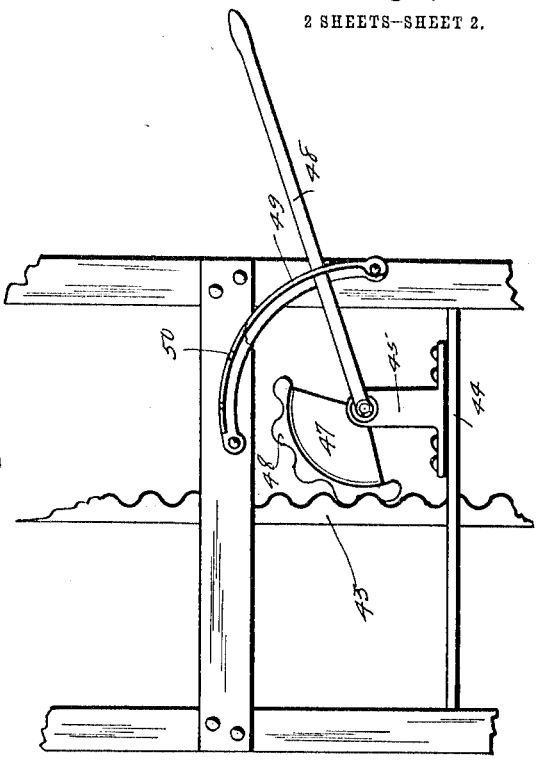
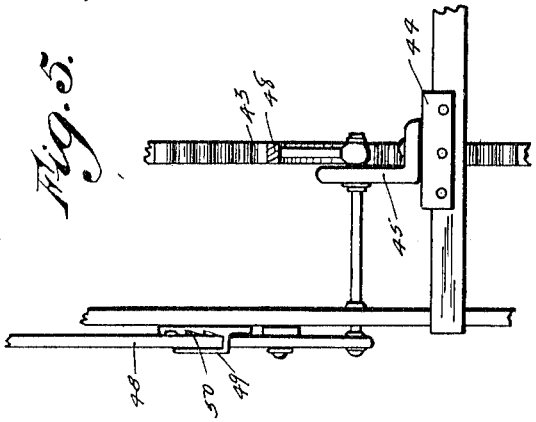
Witnesses:
L. J. Barney
Will Freeman
Inventor:
Harry E. Rex
By Orwig & Bair
Attorneys.

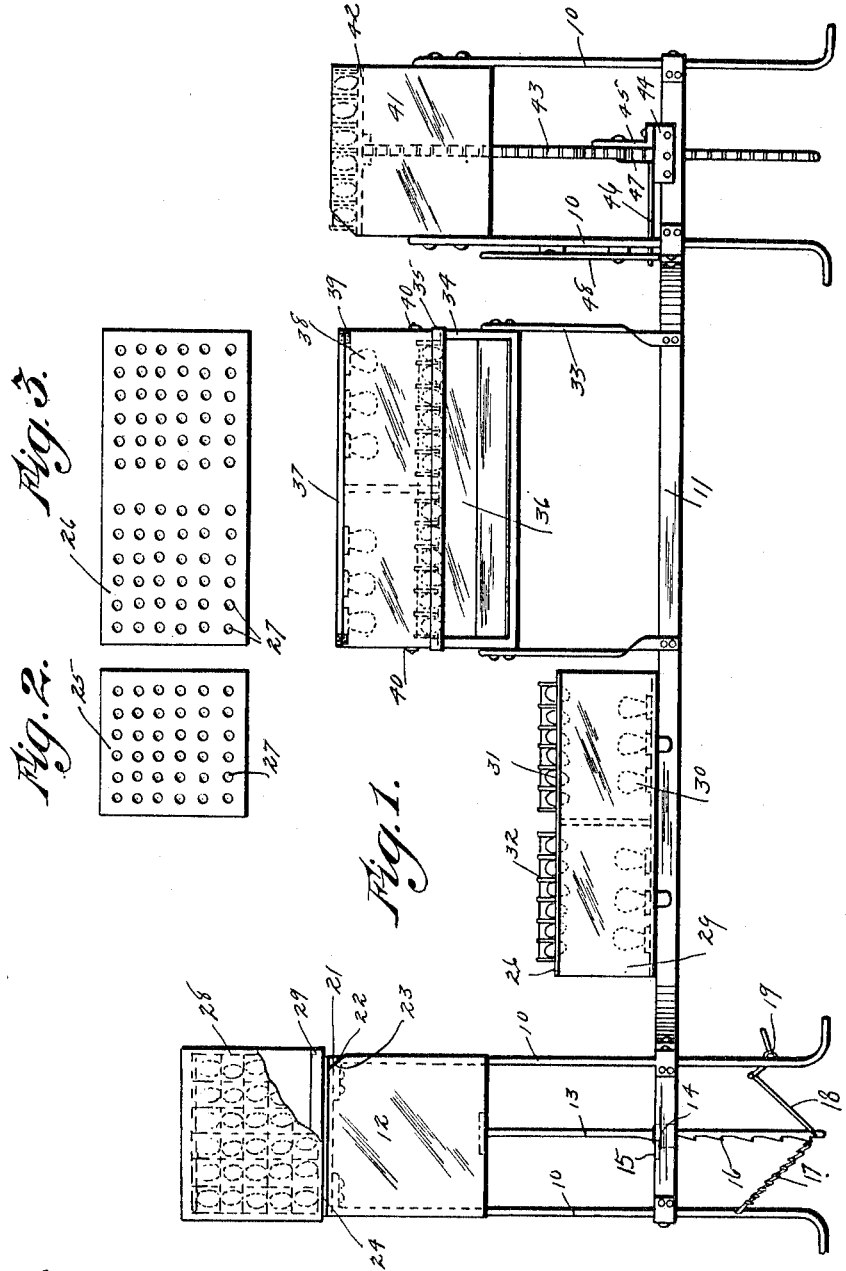

UNITED STATES PATENT OFFICE.

HARRY E. REX, OF DES MOINES, IOWA.

EGG-HANDLING DEVICE.

1,106,059.  Specification of Letters Patent.  Patented Aug. 4, 1914.

Application filed August 25, 1913. Serial No. 786,589.

*To all whom it may concern:*

Be it known that I, HARRY E. REX, a citizen of the United States, and resident of Des Moines, in the county of Polk and State of Iowa, have invented a certain new and useful Egg-Handling Device, of which the following is a specification.

The object of my invention is to provide an egg handling device of simple, durable and inexpensive construction.

More particularly it is my object to provide an egg handling device provided with means whereby eggs may be removed from a case at a single complete operation and placed within a special receptacle.

Still a further object is to provide such a receptacle and a special tray, whereby all the eggs in one filler may be removed at one time in said receptacle.

Still a further object is to provide such a receptacle so constructed that it may be adjusted for removing the eggs as above set forth.

Still a further object is to provide adjustable means for receiving fillers of eggs with eggs therein, one filler at a time, and for moving all the fillers of the eggs into a case at a single operation.

A further object is to provide means for candling the eggs, said means being so constructed and arranged that the eggs may be inspected from all sides.

My invention consists in certain details, in the construction, combination and arrangement of the various parts of the device, whereby all the objects contemplated are attained, as hereinafter more fully set forth, pointed out in my claims and illustrated in the accompanying drawings in which:

Figure 1 shows a front elevation of an egg testing device, embodying my invention. Figs. 2 and 3 show plan views of my improved conveyer or plate for removing the eggs by fillers from the receptacle and for placing them in a second receptacle. Fig. 4 shows a top or plan view of my improved egg testing machine. Fig. 5 shows a detail view of part of the mechanism for operating the second receptacle, and Fig. 6 shows a detail view taken at right angles to the view at Fig. 5, showing part of the same mechanism.

In the accompanying drawings, I have used the reference numeral 10 to indicate generally the supporting legs of my improved egg testing device. The legs 10 are arranged in groups of four, at each end of the device and the four legs at each end are arranged substantially in the form of a rectangle to support the receptacles hereinafter mentioned. The respective groups of four legs are spaced apart from each other and are connected by horizontal members 11. Mounted upon the legs 10, at the left hand end of the machine, as shown in Fig. 1, is a casing or receptacle 12, of approximately the same size and shape as a standard egg case. The receptacle 12 is mounted to slide vertically on the legs 10. Extending downwardly from the case 12, preferably from the middle thereof, is an upright member 13, which extends through an opening 14 in one of the cross members 11, indicated by the dotted lines. Secured to the top of the last mentioned member 11 and extending partly across the opening 14, is a metal plate 15, designed to be engaged by notches 16 on the lower end of the member 13.

It will be seen that the member 11 with the opening 14, together with the plate 15, form a keeper.

Secured to the lower end of the member 13 is a coil spring 17, which is also secured to one of the legs 10. Secured to the member 16 is a link 18 which is pivoted to the bell crank lever 19, which is in turn centrally pivoted on one of the legs 10 and has one arm extending away from the leg 10, so that it may be operated by the foot. Secured to the upper ends of the legs 10, is a table or platform 21, of proper length and width to be received within the receptacle 12 and to permit the latter to slide freely. One of the side walls of the members 12 is cut away at 22, for the purpose which will hereinafter be more fully explained. The end walls of the receptacle 12 are cut away at the upper corner adjacent to the opening 21 for a short distance, as shown at 23 in Fig. 1. Formed at the upper edge of the end walls of the receptacle 12 are outwardly extending flanges 24, designed for convenience to the operator in grasping and raising the said receptacle. For removing the eggs from the receptacle 12 I have provided conveyers 25 and 26, shown in Figs. 2 and 3, comprising flat plates provided with a plurality of openings 27 and made of any proper material or materials.

In the practical use of the receptacle 12, the receptacle is lowered to the lower position of its movement when the platform 21 will fill and close its upper end. A flat board or plate or one of the conveyers 26 is placed on top of the egg case 28 and the case of eggs is then inverted and rested upon the table 21. The operator then grasps the flanges 24 and the cleats 29 on the egg case.

Assuming that the case is filled with eggs 31, placed in the ordinary fillers made up of rectangular compartments with pasteboard partitions between the fillers, the fillers and the eggs therein will rest on the platform 21, while the case 28 will be raised with the receptacle 12 and may then be removed, when the eggs will be within the receptacle 12. The parts 13, 14, 17, 18 and 19 are so constructed and arranged that by pressing downwardly on the outwardly extending arm of the lever 19, the notches 16 will be thrown away from the plate 15 and the receptacle 12 may be lowered as desired. When the receptacle has been lowered to a point where the lower edge of the opening 22 is even with or just below the level of the upper filler of eggs, one of the conveyers 26 is slid under the upper filler. The operator may then grasp the edges of the conveyer 26 and remove the upper filler of eggs. By lowering the receptacle 12, each of the fillers of eggs contained therein may be removed in the same manner.

Mounted upon the members 11 is a receptacle 29, the walls in the bottom of which may be painted white, if desired. In the receptacle 29 are suitable sources of light, as for instance, incandescent electric lights 30. The upper end of the receptacle 29 is open and is of such size that the edges of the conveyers will conveniently rest upon the upper edges of the receptacle 29. When a filler with eggs therein has been lifted from the receptacle 12, resting on the conveyer 26, said conveyer is placed upon the receptacle 29, as shown in Fig. 1. The openings 27 in the conveyers are so located as to correspond approximately to the position of the eggs in the fillers. The lights may be turned on in the receptacle 29 and the eggs may be conveniently and readily tested.

Mounted on the cross members 11 are brackets 33, on which is a frame 34, having a rectangular portion 35 of proper size and shape to support the conveyers 25 and 26. Mounted in the frame 34, below the frame 35, are mirrors 36, properly inclined so that the eggs resting upon the conveyer 26 may be seen reflected in said mirrors by an operator looking into the mirrors from above and in front of said frames. The frame 34 is provided with side and back members whereby it is inclosed. Hinged to the edge of the frame 35 is a receptacle 37, designed to be folded over and above the frame 35 and containing suitable sources of light, such as incandescent electric light globes 38.

It will be understood that the light globes 30 and 38 are connected with suitable sources of electric power. I preferably connect up the lights 30 in the following manner: I prefer to provide in connection with the receptacle 29 wiring systems and switches, so arranged that when the conveyer 26 is placed on the receptacle 29, a switch is turned off, thereby shutting off the current which lights the globes in the room where my device is situated and at the same time another switch it turned on, thereby lighting the lights in the globes 30. A similar lighting system and set of switches is provided for the receptacle 37. The front wall of the receptacle 37 is provided with hinges 39 and catch devices 40, so that said front wall can be raised for removing any particular egg and replacing it with another.

For replacing the eggs in the case, after having been tested, I have provided the following means: Mounted upon the legs 10 of the device, preferably at the end thereof, opposite the receptacle 12, is a receptacle 41, open at the top. Mounted within the receptacle 41 is a horizontal partition 42, shown by the dotted lines in Fig. 1 and designed to slide up and down within said receptacle. The partition 42 is supported by a rack bar 43 which is slidably mounted at its lower end in the frame members. Mounted upon a suitable cross member 44 is a bracket 45 in which is mounted a shaft 46. Fixed on one end of the shaft 46 is a segment 47 having teeth 48, designed to mesh with the teeth of the rack bar 43. On the outer end of the shaft 46 is a lever 48 which is designed to coact with a sector 49, having notches 50, corresponding in number to the number of fillers in an ordinary case of eggs. The parts just described are so arranged that when the lever 48 is moved from one notch of the sector 49 to the next notch thereof, the platform 42 is moved approximately the distance equal to the height of one filler of eggs.

I shall now describe more fully the practical operation of my improved egg testing device.

A case of eggs is inverted on the platform 21 and the case and receptacle 12 are then raised leaving the eggs and the fillers within the receptacle 12. One of the conveyers 26 is then slid through the opening 22 beneath the upper filler of eggs. The receptacle 12 is dropped a distance equal to one notch of the bar 13 and the conveyer 26 with the filler and the eggs therein are removed and placed upon the receptacle 29.

It will be understood that any convenient lighting system may be used for testing the eggs resting on the receptacle 29. The eggs after having been tested are placed upon the frame 35 and are tested for cracks in the shells or other defects which might possibly not be visible from above. Should any of the eggs be defective, the front wall of the receptacle 37 may be raised and the defective egg removed and another egg put in its place. After the eggs have thus been thoroughly tested, the platform 42 is moved to the position shown by the dotted lines in Fig. 1, with the rack bar in the position shown by the dotted lines and the conveyer 26 is slid into the receptacle 41, resting upon the platform 42. The conveyer 26 may then be removed and the second filler of eggs taken from the receptacle 12. The receptacle 12 is gradually lowered as the eggs are removed to give access to the next lower fillers. After the first filler has been placed upon the platform 42 of the receptacle 41, the lever 48 is moved for lowering the platform 42 and the second filler may be placed above the first filler and the operation continued until all the eggs in a case have been removed therefrom, tested and placed within the receptacle 41. The receptacle 41 is gradually raised and the additional fillers are placed in position above the platform 42. When the receptacle 41 is filled an egg case is inverted on top of said receptacle and the platform 42 is raised. A conveyer 26 on the flat plate is placed on the platform 42 before the first filler of eggs is rested thereon and when the receptacle 41 with the egg case above it is lowered until an operator can grasp the case and the plate or conveyer 26 on the platform 42, the case of eggs is turned over to its normal position and is ready for use.

The advantages of my improved device for testing eggs are largely seen from the foregoing description.

It will be seen that the eggs may be tested by fillers instead of one or two at a time and the eggs may be handled by fillers instead of one or two at a time. Considering the standard egg cases now in use, this means that the eggs can be handled thirty-six or seventy-two at a time. The eggs are thoroughly and completely tested and may be viewed from all points by simply removing the fillers. It may be noted in this connection that the receptacle 12 and the mechanism shown therewith, could be used for filling the cases as well as for removing the eggs from them by reversing the order of operations hereinbefore described and the receptacle 41 and platform 42 could be used for removing the eggs from a case by reversing the order of operations therewith, as hereinbefore set forth.

With my device, the eggs may be tested in a very short time and with a minimum number of operations and all possible defects would be discovered on account of the use of the lights above and below the eggs and the use of the mirrors 36.

I claim as my invention:

1. In an egg handling device, a supporting frame, a horizontal platform mounted thereon, and a receptacle, open above and below, mounted to slide vertically on said frame and to receive said platform.

2. In an egg handling device of the class described, a supporting frame, a horizontal platform mounted thereon, a receptacle, open above and below, mounted to slide vertically on said frame and to receive said platform, said receptacle having one wall cut away at its upper edge, and a conveyer, designed to enter said receptacle where said portion is cut away.

3. In an egg handling device, a supporting frame, a horizontal platform mounted thereon, a receptacle, open above and below, mounted to slide vertically on said frame and to receive said platform, means for supporting said receptacle in certain positions the same relative distances apart, and means whereby said supporting means may be released for lowering said receptacle a certain distance.

4. In an egg handling device, a supporting frame, a horizontal platform mounted thereon, a receptacle, open above and below, mounted to slide vertically on said frame and to receive said platform, and adjustable means for supporting said receptacle in various positions.

5. In an egg handling device, a supporting frame, a horizontal platform mounted thereon, a receptacle, open above and below, mounted to slide vertically on said frame and to receive said platform, adjustable means for supporting said receptacle in various positions, said means comprising an upright pivoted below said receptacle, having a plurality of notches, a keeper, a plate therein to engage said notches, a coil spring secured to said upright and to said frame for holding said notches against said plate, and means for drawing said upright away from said plate.

Des Moines, Iowa, August 20, 1913.

HARRY E. REX.

Witnesses:
S. ROBINSON,
M. WALLACE.